US012714009B2

(12) United States Patent
Nolte et al.

(10) Patent No.: US 12,714,009 B2
(45) Date of Patent: Aug. 25, 2026

(54) LIQUID FERTILIZER CONTROL SYSTEMS, METHODS, AND APPARATUS FOR AGRICULTURAL IMPLEMENTS

(71) Applicant: Kinze Manufacturing, Inc., Williamsburg, IA (US)

(72) Inventors: Steve Nolte, Williamsburg, IA (US); Denny Williams, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 861 days.

(21) Appl. No.: 17/937,059

(22) Filed: Sep. 30, 2022

(65) Prior Publication Data

US 2023/0105843 A1 Apr. 6, 2023

Related U.S. Application Data

(60) Provisional application No. 63/261,973, filed on Oct. 1, 2021.

(51) Int. Cl.
*A01C 23/00* (2006.01)

(52) U.S. Cl.
CPC .................................. *A01C 23/007* (2013.01)

(58) Field of Classification Search
CPC .......... A01C 23/007; A01C 7/06; A01C 23/04
See application file for complete search history.

(56) References Cited

U.S. PATENT DOCUMENTS

| | | | | |
|---|---|---|---|---|
| 3,037,636 A * | 6/1962 | Mcfarlin | F16L 55/24 210/429 |
| 3,060,872 A | 10/1962 | Ackley | |
| 3,147,922 A * | 9/1964 | Warner | A01M 7/0089 239/304 |
| 4,244,522 A | 1/1981 | Hartwig | |
| 4,796,550 A | 1/1989 | Van Natta et al. | |
| 5,473,999 A | 12/1995 | Rawson et al. | |
| 5,520,125 A | 5/1996 | Thompson et al. | |
| 5,685,245 A | 11/1997 | Bassett | |
| 5,829,370 A | 11/1998 | Bender | |
| 5,967,066 A | 10/1999 | Giles et al. | |
| 6,070,538 A | 6/2000 | Flamme et al. | |
| 6,070,539 A | 6/2000 | Flamme et al. | |
| 6,142,085 A | 11/2000 | Drever et al. | |
| 6,230,091 B1 | 5/2001 | Mcquinn | |
| 6,748,884 B1 | 6/2004 | Bettin et al. | |
| 7,162,961 B2 | 1/2007 | Grimm et al. | |

(Continued)

OTHER PUBLICATIONS

International Search Report and Written Opinion in PCT/US2022/077319, mailed Jan. 19, 2023, 11 pages.

*Primary Examiner* — Nicole Coy
(74) *Attorney, Agent, or Firm* — McKee, Voorhees & Sease, PLC

(57) ABSTRACT

A liquid fertilizer system is used with agricultural implements to apply liquid fertilizer, in a desired amount, to a field and/or crop. The fertilizer system relies on system pressure to regulate the flow of the liquid fertilizer through and out of the system. The pressure is regulated, at least in part, by a motorized relief valve, which may be a pressure regulator that is modulated with a spring. The spring provides a nuanced adjustment mechanism that responds quickly to changes, and which is responsive to more minute changes to the system.

14 Claims, 6 Drawing Sheets

(56) References Cited

U.S. PATENT DOCUMENTS 7,311,004 B2 12/2007 Giles
7,487,732 B2 2/2009 Johnston et al.
7,552,689 B2 6/2009 Schaffert
7,665,539 B2 2/2010 Bassett et al.
7,694,638 B1 4/2010 Riewerts et al.
7,826,930 B2 11/2010 Giles et al.
7,921,932 B2 4/2011 Poole
8,141,652 B2 3/2012 Poole et al.
8,151,717 B2 4/2012 Bassett
8,205,566 B2 6/2012 Martin
8,523,085 B2 9/2013 Grimm et al.
8,622,253 B1 1/2014 Litterly et al.
8,776,701 B2 7/2014 Nikkel et al.
8,794,164 B2 8/2014 Sauder et al.
8,794,344 B2 8/2014 Blunier et al.
8,794,346 B2 8/2014 Blunier et al.
8,820,427 B2 9/2014 Blunier et al.
8,844,838 B2 9/2014 Funseth et al.
8,868,300 B2 10/2014 Kocer et al.
8,869,909 B2 10/2014 Blunier et al.
8,910,581 B2 12/2014 Bassett
9,144,191 B1 9/2015 Gramling et al.
9,161,488 B2 10/2015 Blunier
9,198,343 B2 12/2015 Mariman et al.
9,380,738 B2 7/2016 Nelson, Jr.
9,408,337 B2 8/2016 Sauder et al.
9,445,538 B2 9/2016 Roth et al.
9,510,525 B2 * 12/2016 Schmidt .............. A01M 7/0089
9,532,499 B2 1/2017 Anderson et al.
9,693,497 B2 7/2017 Schaffert
9,713,299 B2 7/2017 Blunier et al.
9,756,780 B2 9/2017 Blunier et al.
9,775,274 B2 10/2017 Steinlage et al.
9,775,285 B2 10/2017 Blunier
9,795,977 B2 10/2017 Grimm et al.
9,801,334 B2 10/2017 Blunier et al.
9,820,427 B2 11/2017 Hagny
9,854,722 B2 1/2018 Blunier et al.
9,918,424 B2 3/2018 Blunier et al.
9,936,632 B2 4/2018 Bruns et al.
9,974,221 B2 5/2018 Kowalchuk
9,980,429 B2 5/2018 Levy
9,999,175 B2 6/2018 Baurer et al.
10,045,474 B2 8/2018 Bachman et al.
10,104,825 B2 10/2018 Blunier et al.
10,130,028 B2 * 11/2018 Kolb .................... A01C 23/023
10,173,236 B2 1/2019 Preheim et al.
10,178,825 B2 1/2019 Ardison et al.
10,182,522 B2 1/2019 Adams et al.
10,271,474 B1 * 4/2019 Miller .................... A01G 25/06
10,278,325 B2 5/2019 Anderson et al.
10,356,975 B2 7/2019 Conrad
10,371,277 B2 8/2019 Needham et al.
10,420,333 B2 9/2019 Mellin
10,512,212 B2 12/2019 Koch et al.
10,548,256 B2 2/2020 Graham et al.
10,729,123 B2 8/2020 Kolb et al.
10,768,331 B2 9/2020 Koch et al.
10,768,340 B2 9/2020 Koch et al.
10,772,256 B2 9/2020 Stuber
10,791,666 B2 10/2020 Sauder et al.
10,798,870 B2 10/2020 Schaffert et al.
10,799,900 B2 10/2020 Grimm et al.
10,799,903 B2 10/2020 Davis et al.
10,813,263 B2 10/2020 Connell et al.
10,813,276 B2 10/2020 Heathcote
10,813,278 B2 10/2020 Adams et al.
10,813,281 B2 * 10/2020 Gilbert ................ A01M 7/0089
2013/0144827 A1 6/2013 Trevino et al.
2014/0060867 A1 3/2014 Blunier et al.
2014/0252111 A1 9/2014 Michael et al.
2014/0262382 A1 9/2014 Schaffert
2014/0277959 A1 9/2014 Wagers et al.
2014/0361094 A1 12/2014 Michael
2015/0257334 A1 9/2015 Wolters et al.
2016/0050837 A1 2/2016 Schaffert et al.
2016/0245678 A1 8/2016 Yang
2017/0086363 A1 3/2017 Tribelhorn
2017/0139429 A1 5/2017 Grimm et al.
2017/0314580 A1 11/2017 Steensma et al.
2018/0116102 A1 5/2018 Taylor et al.
2019/0045703 A1 2/2019 Bassett
2019/0057462 A1 2/2019 Bakke et al.
2019/0124826 A1 5/2019 Pickett et al.
2019/0141880 A1 5/2019 Zemenchik et al.
2019/0159398 A1 5/2019 McMenamy et al.
2019/0216009 A1 7/2019 Stoller et al.
2019/0232304 A1 8/2019 Grimm et al.
2019/0232313 A1 8/2019 Grimm et al.
2019/0246552 A1 8/2019 Sauder et al.
2019/0271356 A1 9/2019 Schaffert et al.
2019/0350127 A1 11/2019 Sauder et al.
2019/0357426 A1 11/2019 Wolff et al.
2020/0022301 A1 1/2020 Ritland et al.
2020/0023398 A1 1/2020 Feldhaus et al.
2020/0037496 A1 2/2020 Stoller et al.
2020/0096019 A1 3/2020 Schrader et al.
2020/0104988 A1 4/2020 Baurer et al.
2020/0146208 A1 5/2020 Bassett
2020/0196520 A1 6/2020 Schoeny et al.
2020/0214193 A1 7/2020 Shivak
2020/0221682 A1 7/2020 Grimm et al.
2020/0245526 A1 8/2020 Ritland et al.
2020/0249218 A1 8/2020 Strnad et al.
2020/0253107 A1 8/2020 Madison et al.
2020/0253111 A1 8/2020 Schlipf et al.
2020/0260630 A1 8/2020 Stanhope et al.
2020/0296882 A1 9/2020 Madison et al.
2020/0296885 A1 9/2020 Stoller et al.

* cited by examiner

LIQUID FERTILIZER CONTROL SYSTEMS, METHODS, AND APPARATUS FOR AGRICULTURAL IMPLEMENTS

CROSS REFERENCE TO RELATED APPLICATIONS

This application claims priority under 35 U.S.C. § 119 to provisional patent application U.S. Ser. No. 63/261,973, filed Oct. 1, 2021. The provisional patent application is herein incorporated by reference in its entirety, including without limitation, the specification, claims, and abstract, as well as any figures, tables, appendices, or drawings thereof.

FIELD OF THE INVENTION

The invention relates generally to an apparatus and/or corresponding method of use in at least the delivering of liquid products, for a liquid application system, generally applicable to fertilizers. More particularly, but not exclusively, the invention relates to a system and method of regulating liquid fertilizer distribution for administering said liquid in a better controlled environment to agricultural fields.

BACKGROUND OF THE INVENTION

Fertilizer systems in the prior art consist of either dry or liquid fertilizers. For those that do not use a liquid fertilizer, the systems generally use a granular or other forms of fertilizer that are difficult to handle and apply, difficult to blend and to apply uniformly. Because of this, other prior art has transitioned to liquid fertilizers. Liquid applicators of fertilizer in the prior art are expensive systems to purchase, maintain, and use. For a given fertilizer system, the prior art may use a pump for every single row unit. While this ostensibly provides the greatest amount of control over the specific amount of fertilizer applied to various portions of an agricultural field, more pumps mean more money per pump purchased, more energy to run each pump, more parts that can potentially break down, and overall, more headache all to be able to get the fertilizer applied in the amounts desired to the specific portions of an agricultural field. Other prior art uses a flow meter for each row unit to assist in controlling the distribution of the liquid, which has similar disadvantages to using a pump for each row unit. Additional liquid fertilizer systems use overly complex configurations of differing diameters of tubes, specific size and difficult to replace valves, and because of the extreme particularity required for the system to function as it should and the overall complexity, there are still many that prefer to just stay away from using liquid fertilizers.

Other prior art has attempted to simplify the liquid application systems while maintaining the same amount of control by using complex ball valves with multiple openings and offsetting them for specific affects, but still using a large number of flow meters to control the flow of the liquid fertilizer.

Thus, there exists a need in the art for an apparatus which simplifies the design of fertilizer distribution systems, thus saving users time, money, energy, and headache, while maintaining control of the liquid application of the fertilizer in a manner that meets the needs of the given agricultural field.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage of the invention to penetrate the soil of agricultural fields immediately with a liquid fertilizer rather than a dry fertilizer thus giving faster access to plants the nutrients which are being supplied by the fertilizer and ensure that the nutrients thus supplied to the plants an equal blend from the liquid which cannot always be achieved with dry fertilizers.

It is still yet a further object, feature, and/or advantage of the invention to simplify the construction of and maintaining of liquid fertilizer application systems.

It is still yet a further object, feature, and/or advantage of the invention to improve control of liquid fertilizer systems by regulating the pressure of the system rather than by regulating the liquid flow via added restriction checkpoints throughout the liquid's path. Moreover, to assist in controlling the liquid application system by regulating the pressure of the system rather than the flow, an adjustable relief valve modulated with a spring is used rather than using a ball-valve that has slow transitions between settings, is compromised in reaction speed and accuracy, and traditionally has only on and off settings. The motorized relief valve modulated with a spring is capable not only of quick responsiveness but is also capable of offering vast amounts of variability in settings that are available.

For example, the motorized relief valve modulated with a spring can be set to nearly any setting in between the completely-on or completely-off positions with instantaneous precision and smooth transition between settings. This offers great variability that the ball-valve cannot offer, as the ball-valve often even causes stress on the system due to its nature of jumping from one setting to another (either on, or off, for example) thus jolting the system to greatly differing settings rather than transitioning to each setting one infinitesimal increment at a time.

It is still yet a further object, feature, and/or advantage of the invention to improve response time by controlling liquid fertilizer systems with regulating and administering the distribution of the liquid through system pressure control rather than by regulating the distribution of the liquid with flow because regulating flow requires waiting for feedback to know what the flow is. After said feedback is received, then instructions for flow control can be selected and carried out. However, for system pressure control, all that needs to be done is to tell the system to go to a desired pressure and the system executes the command by going to the given pressure for the system, thus bypassing the requirement of receiving feedback to be able to do as the user commands. It is an improvement in the art to increase the speed of controlling the liquid's distribution by regulating via pressure instead of flow, thus bypassing the feedback requirement, and by using a motorized relief valve modulated with a spring. This combination provides for the simplification of fertilizer systems, while maintaining precision in control of the system at improved speeds.

With the modulating pressure control system, the change in flowrate demand is quickly accounted for as the pressure is maintained via a mechanical spring which negates the need for instantaneous sensor feedback and valve adjustment. By controlling based on the system pressure, the system is able to control the actual flow more accurately to the system during these transitions.

The system disclosed herein can be used in a wide variety of applications. For example, the system can be used on an agricultural implement to fertilize the plant products of agricultural fields. The system disclosed can also be used for the regulation, administering, and distribution of pesticides, herbicides, fungicides, and the like which are in liquid form.

It is preferred the apparatus be safe, cost effective, and durable. For example, the use of components, such as a diaphragm pump, is included so as to improve the efficiency of the system, to ensure that the system operates reliably, and to manage the cost of the system.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of a system which accomplish some or all of the previously stated objectives.

The system can be incorporated into larger designs which accomplish some or all of the previously stated objectives.

According to some aspects of the present disclosure, a system for controlling liquid fertilizer distribution for an agricultural implement comprises a positive displacement pump for pulling liquid fertilizer from a system source, wherein the positive displacement pump is in communication with a hydraulic motor to transport the liquid fertilizer, a motorized relief valve modulated with a spring, wherein the motorized relief valve acts to regulate the pressure of the system, and a flowmeter to display flow of the liquid fertilizer.

According to at least some aspects of some embodiments, an electric ball valve is included to shut off the system.

According to at least some aspects of some embodiments, one or more strainers are included to reduce particulates in the liquid fertilizer moving through the system.

According to at least some aspects of some embodiments, the system operates at system level to provide the liquid fertilizer to one or more row units of the agricultural implement.

According to at least some aspects of some embodiments, the system regulates pressure of the liquid fertilizer.

According to at least some aspects of some embodiments, a flow switch is included to confirm the presence of the liquid fertilizer in the system.

According to at least some aspects of some embodiments, both the set pressure and the measured flow from the flowmeter are used to operate the system.

According to at least some aspects of some embodiments, the motorized relief valve comprises a pressure regulator.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for typical purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Figure 1:
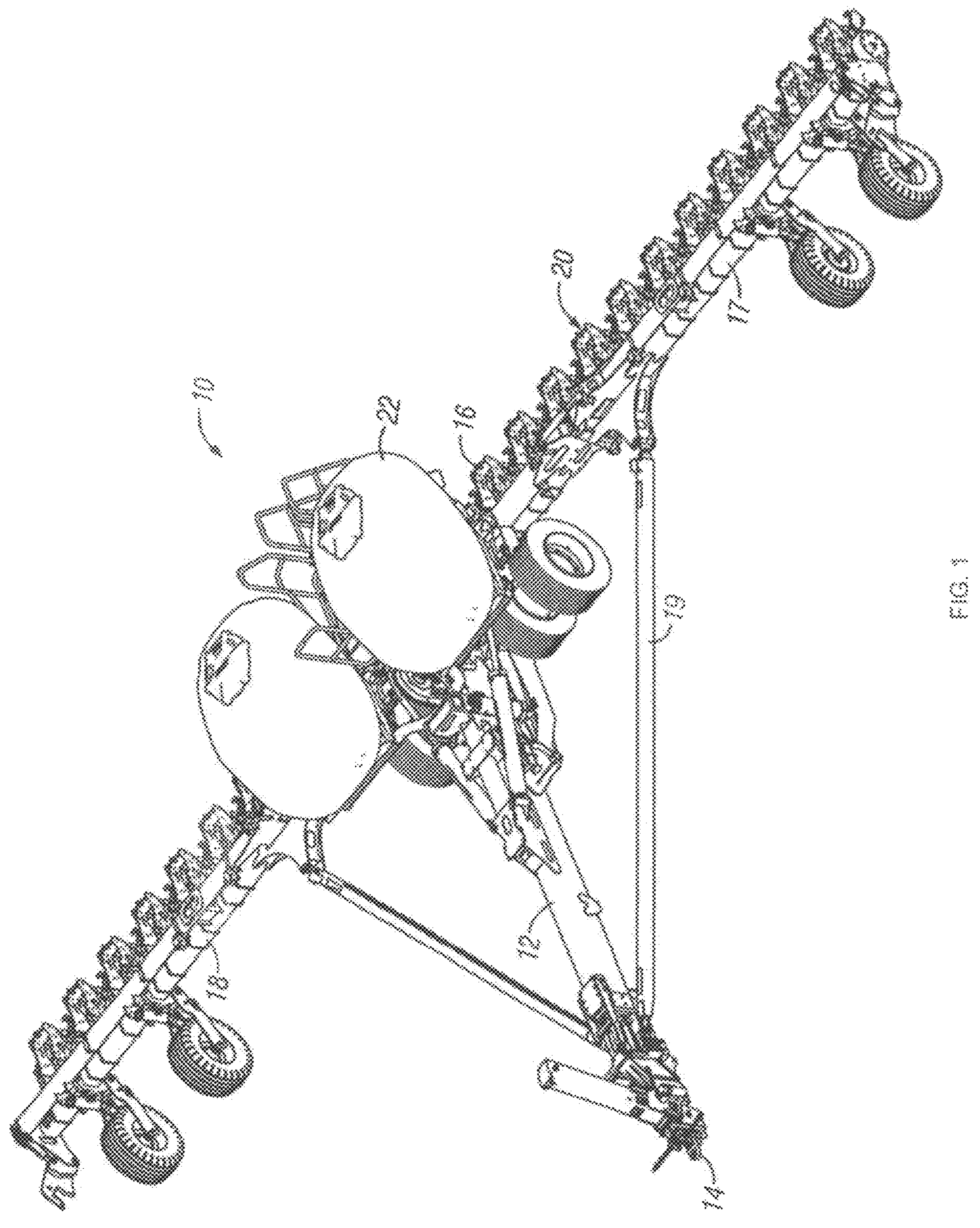
FIG. 1 is a perspective view of an agricultural planting implement.
Figure 2:
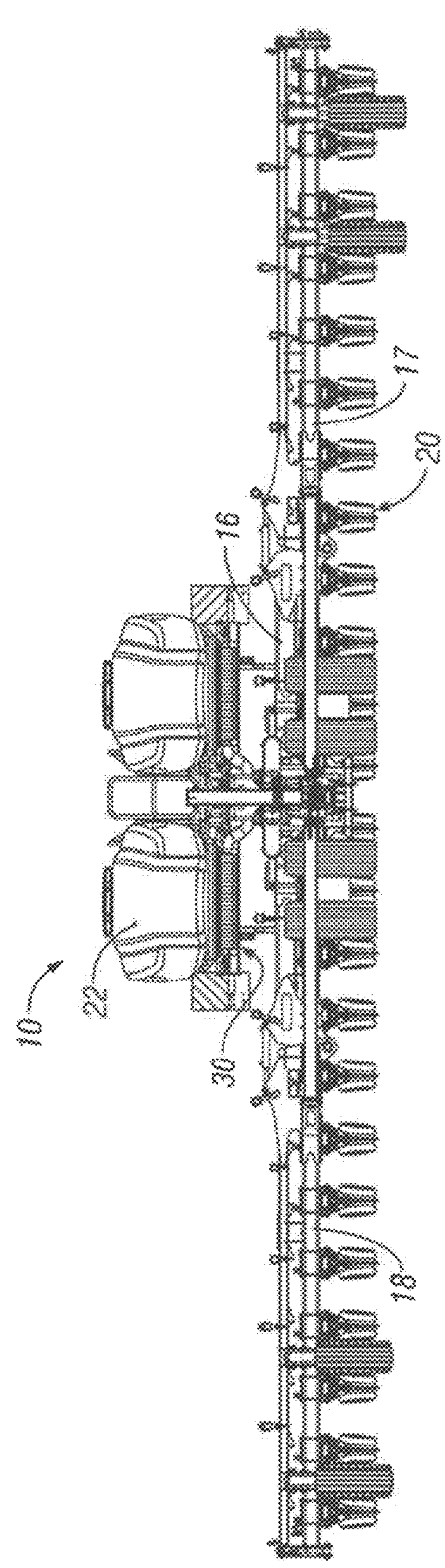
FIG. 2 is a front elevation view of the planting implement.
Figure 3:
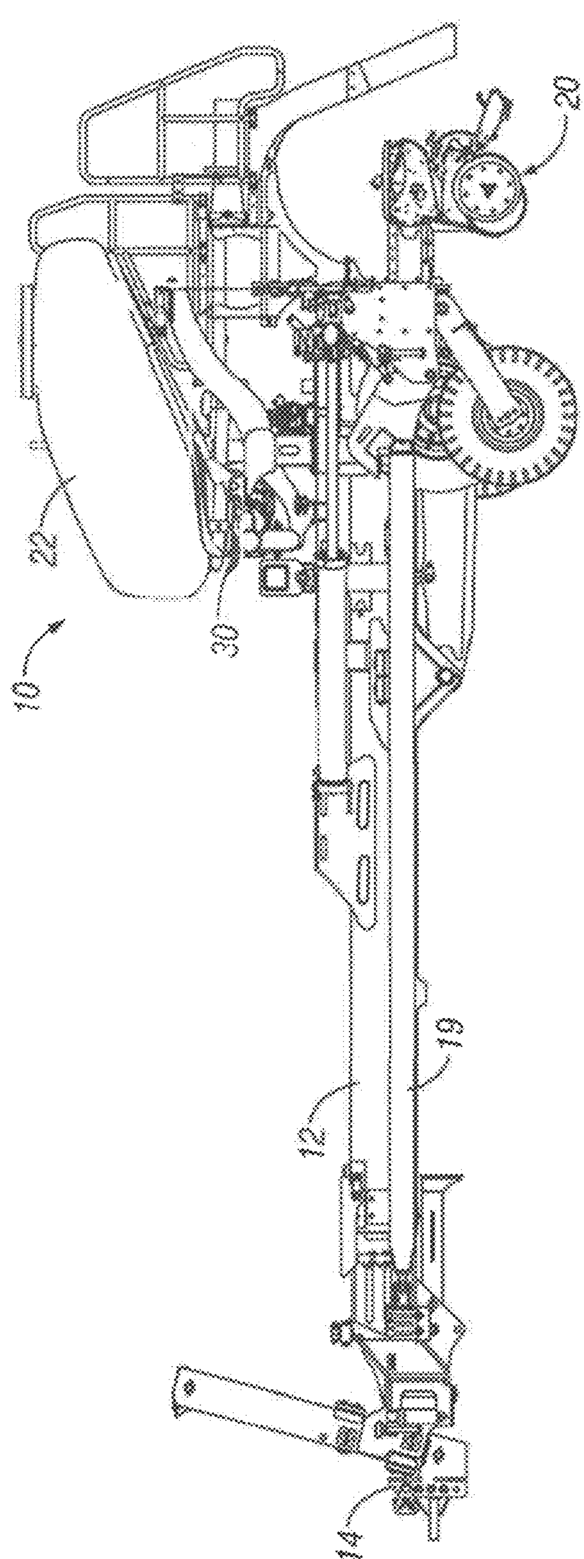
FIG. 3 is a side elevation view of the planting implement.

FIGS. 1-3 disclose an agricultural implement 10. The agricultural implement 10 as shown in the figures is a planting implement 10. The implement 10 may be generally any implement for engaging with the ground or otherwise distributing a material, such as a particulate material to the ground. As will be understood, the implement includes ways to distribute material, such as a particulate material to various ground engaging apparatus to evenly distribute said particulate material into accurately, efficiently, and in some embodiments at high speed distribute said particulate material to or in said ground. Furthermore, as will be understood, while the planting implement 10 as shown in the figures is provided, additional types of implements including additional planting implements with various features as is known can utilize the invention and/or aspects thereof to be able to distribute and apply the particulate material, such as seed, to the ground.

Therefore, the planting implement 10 as shown in the figures includes a tongue 12 with a hitch 14 at a first end and a tool bar extending generally transversely to the tongue 12 at a second end. The tool bar 16 extends to connect to a plurality of row units 20 which include ground engagement apparatus. The row units 20 may also include additional aspects such as metering elements, singulation elements, ground opening, closing elements, metering system, and the like. However, it is to be appreciated that generally other types of row units, ground engaging elements, and/or metering elements can utilize any of the aspects of the invention disclosed herein. For example, the row units 20 could include fertilizer or other particulate material application apparatus, and the entrainment system disclosed be used to distribute the particulate material to the row units 20.

Extending outwardly from the toolbar 16 and also generally transverse to the tongue 12 are wing elements 17 and 18. The wing elements 17, 18 provide additional width of the toolbar such that additional row units 20 can be attached along thereto. This will allow for a greater number of row units 20 to be attached to the toolbar to be used for distributing for a particulate material. Additional elements show in the figures include draft links 19, which generally connect the wings 17, 18 to the tongue 12. One or more actuators can be connected to the system to provide for the wings 17, 18 to be folded in a generally forward manner wherein they will be somewhat parallel to the tongue 12 to move the planting implement 10 from a field use configuration to a row use configuration. However, additional planting units may include that the toolbar is lift and rotated, is folded rearwardly, does not fold at all, or include some sort of combination thereof.

Agricultural planting implements, such as the one shown in FIGS. 1-3, are used to distribute, meter, and place particulate materials, such as seed, in operable and/or desired locations in a field. This is based, in part, on agronomical data, which is used to determine the optimal spacing, depth, and location of seed to give the seed the best chance to mature into a crop with the best possible yield.

To further aid in increasing the performance and growing of crop from a planted seed, implements can includes systems and other apparatus that are used to apply, place, or otherwise dispense a fertilizer, such as a liquid or dry fertilizer material. For agricultural planting implements, the fertilizer applicator system, such as shown and described herein, can be included with the row units of the planter. This will provide the application of the fertilizer contemporaneously, or near-contemporaneously, with the planting of the seed. The system can include one or more hoppers 22, either at the bulk hopper site 30, at the individual row units, or split out to cover regions or sections of row units, wherein the application sites will be fed an amount of the liquid fertilizer.

Figure 4:
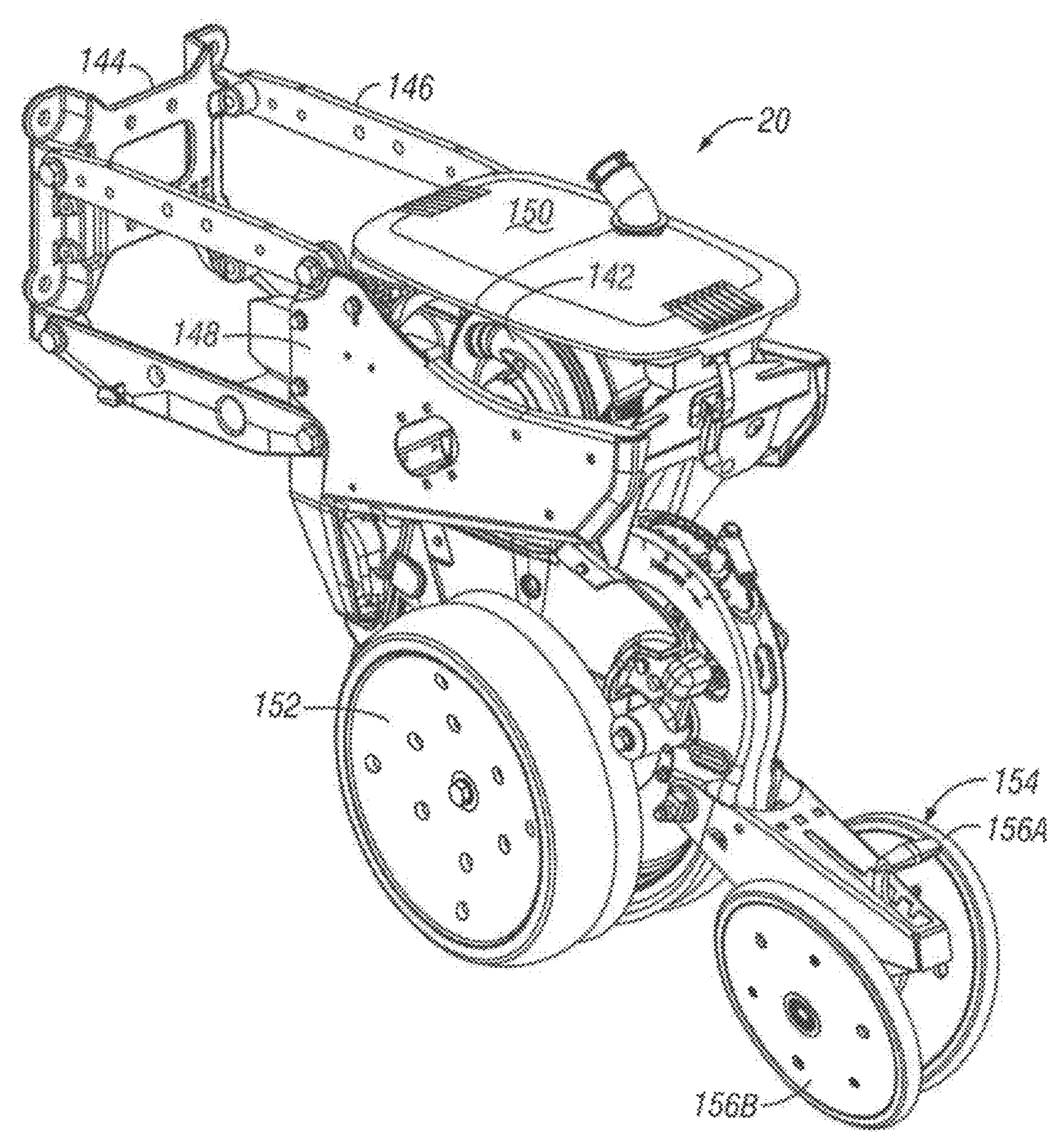
FIG. 4 is a perspective view of a row unit for use with an agricultural planting implement.
Figure 5:
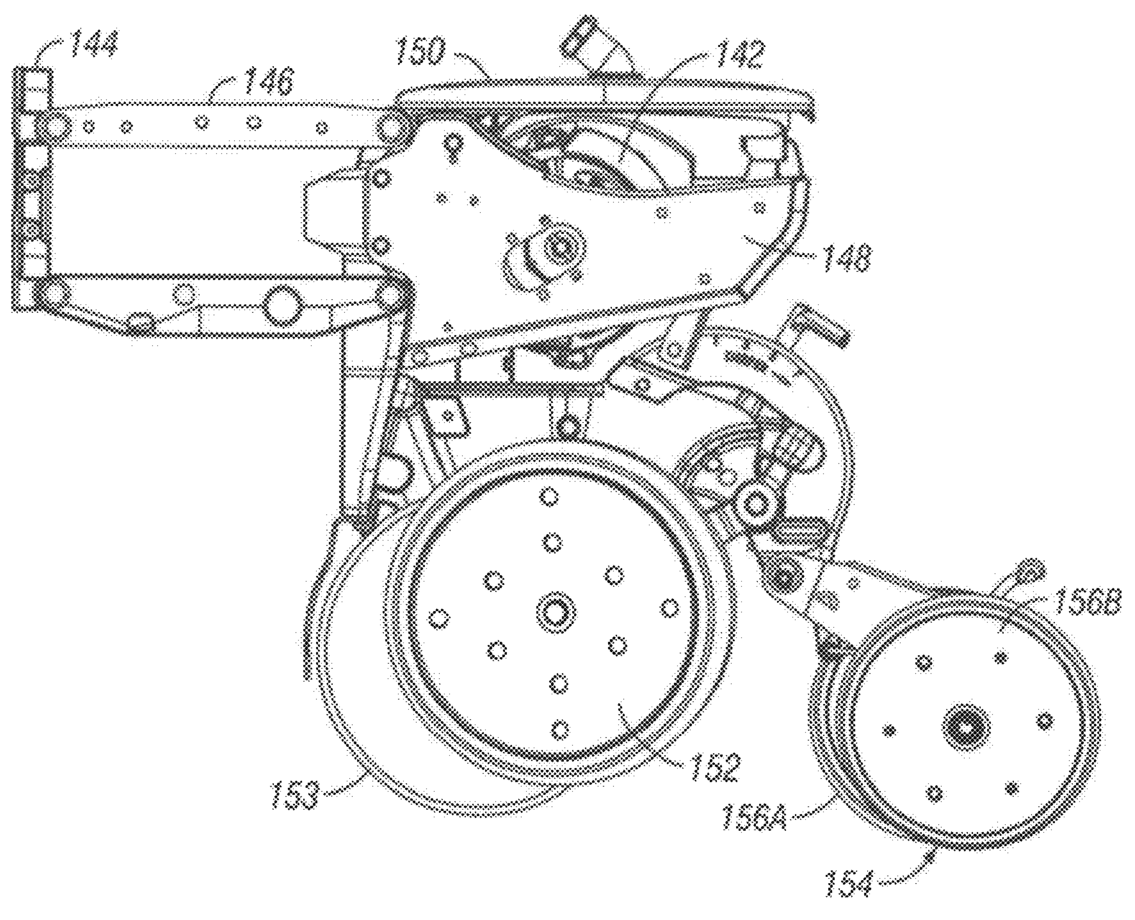
FIG. 5 is a side elevation view of the row unit.

As mentioned, the implement 10 as shown herein includes a plurality of row units 20 extending from the wings 17, 18 and the toolbar 16. A planter row unit 20 with an air seed meter 142 positioned therewith is shown in FIGS. 4 and 5. For example, the seed meter 142 may utilize a negative or positive air pressure to retain and transport seed about one or more seed discs within the seed meter housing. The row unit 20 and air seed meter 142 may be of the kind shown and described in U.S. Pat. No. 9,282,691, which is hereby incorporated in its entirety. However, it should be appreciated that aspects of embodiments of the present disclosure contemplate other types of seed meters, including mechanical, brush, finger, or the like, which may be used with the invention. In addition, the seed meter may be a multi-hybrid seed meter that is capable of dispensing one of a plurality of types, varieties, hybrids, etc. of seed at a row unit, such as by the use of multiple seed discs within the seed meter housing.

The row unit 20 includes a U-bolt mount (not shown) for mounting the row unit 20 to the planter frame or tool bar 16 (on central frame and wings 17, 18), as it is sometimes called, which may be a steel tube of 5 by 7 inches (although other sizes are used). However, other mounting structures could be used in place of the U-bolt. The mount includes a face plate 144, which is used to mount left and right parallel linkages 146. Each linkage may be a four-bar linkage, as is shown in the figures. The double linkage is sometimes described as having upper parallel links and lower parallel links, and the rear ends of the parallel links are pivotally mounted to the frame 148 of the row unit 20. The frame 148 includes a support for the air seed meter 142 and seed hopper 150, as well as a structure including a shank for mounting a pair of ground gage wheels 152. The frame 148 is also mounted to a closing unit 154, which includes a pair of inclined closing wheels 156A, 156B. The row unit 20 also includes a pair of opener discs 153. While the row unit 40 shown in FIGS. 12 and 13 is configured to be used with a bulk fill seed system, it is to be appreciated that the row unit 20 may have one or more row hoppers 150 at each of the row units 20. Exemplary versions of row units with individual hoppers are shown and described in U.S. Pat. No. 9,420,739, which is hereby incorporated in its entirety.

The implement 10 and row units 20 shown and described in FIGS. 4-5 include an air seed meter 142 for singulating and transporting seed or other particulate material from the seed delivery source to the created furrow in the field prior to the closing wheels 56 closing said furrow.

Still further, it should be appreciated that the fertilizer system as disclosed herein could be used with other types of agricultural implements, including, but not limited to, sprayers, tillage equipment, plows, discs, and the like. The system can be configured to work with generally any type of implement to be able to better apply material, such as liquid fertilizer, to a field as the implement moves therethrough.

Figure 6:
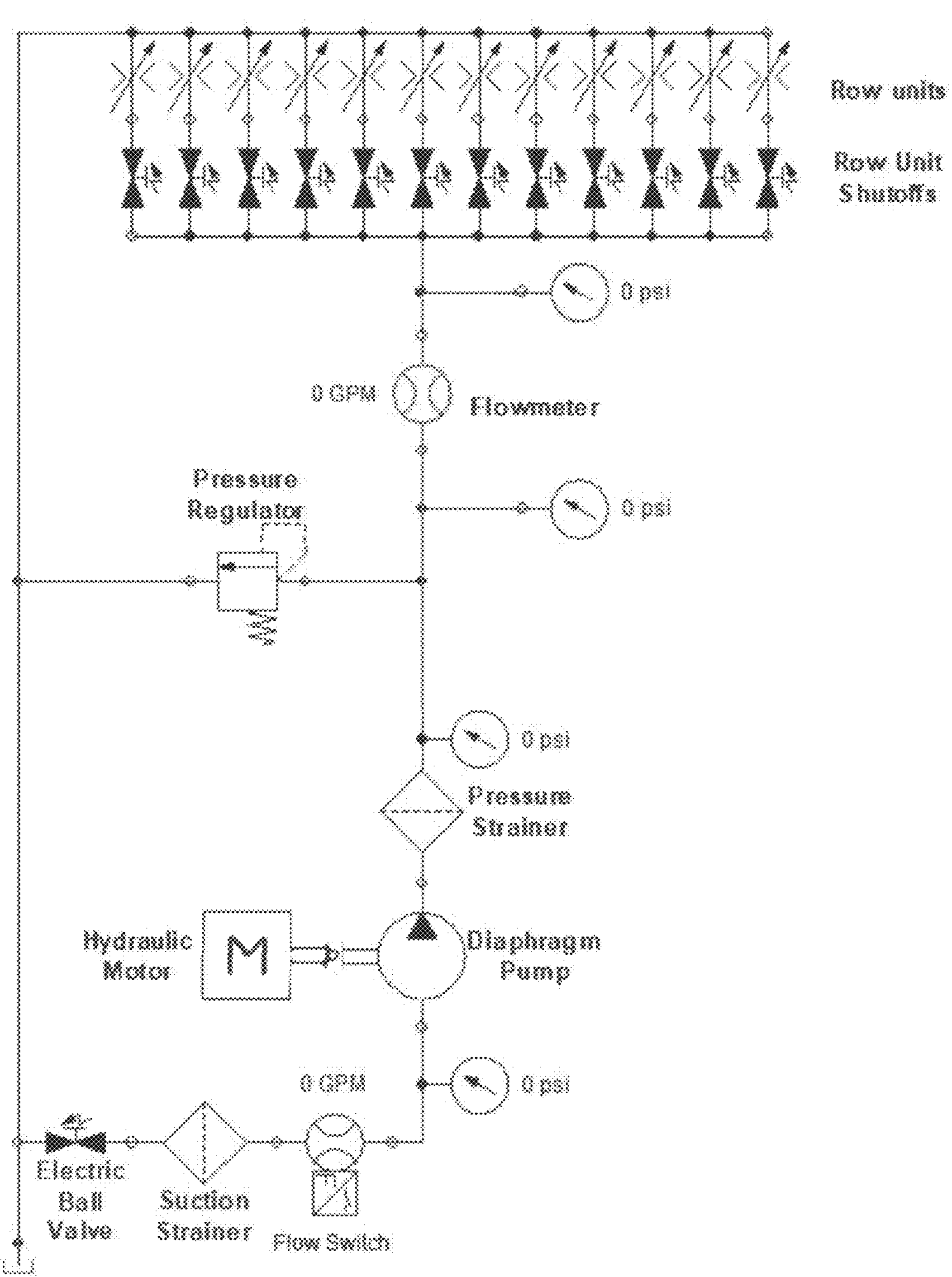
FIG. 6 is a schematic drawing of the liquid fertilizer application system.

FIG. 6 depicts an embodiment of a liquid fertilizer application system according to aspects and/or embodiments. A supply, such as in the form of one or more hoppers, is provided. The supply can be in the form of bulk hoppers for all row units, hoppers for a collection or region of units, or could be provided on-row for each of the row units. In the embodiments shown, the supply is considered to be of the bulk hopper type. The liquid fertilizer reaches each of the row units from the supply via one or more conduits and a positive displacement pump. Positive displacement pumps can include, but are not limited to, diaphragm pumps, helical rotors (progressive cavity pumps), peristaltic hose pumps, piston pumps, and rotary lobes (gear pumps). The embodiment shown in FIG. 6 includes a diaphragm pump. The diaphragm pump shown in FIG. 6 operates by way of a drive source, which is shown to be a hydraulic motor. However, it should also be appreciated that other types of pumps, including the diaphragm pump, could be driven with an electric motor.

Still further, the supply or source for the liquid fertilizer could take many forms, including, but not limited to, a hopper or hoppers, a towed trailer tank or tanks, planter mounted tank or tanks, and/or tractor mounted tank or tanks.

Once the liquid fertilizer is pulled from the supply, the liquid fertilizer passes through an electric ball valve. This electric ball valve is in place for either the immediate shutoff or operation of the system.

After the liquid fertilizer passes through the electric ball valve, the liquid then goes through a filtering device, which is shown to be a suction strainer, to mitigate particulate matter from entering and damaging the pump. Particularly, a suction strainer that has an integrated foot valve prevents the suction line from running empty after the pumping operation has been completed. After the liquid travels through the suction strainer, the liquid then flows through a flow switch to confirm the presence of the fluid coming into and through the system. This will aid in mitigating and/or avoiding extended time of positive displacement pump cavitation. Placing the flow switch, rather than a flow meter, before the positive displacement pump also offers versatility, lowers cost, and improves the overall accuracy of the system. The flow switch can function by sending trip signals to the positive displacement pump, which can further communicate to the positive displacement pump to shut off or to turn on. Thus, the flow switch can protect the positive displacement pump from damage and provides the benefit of cooling circuit protection.

Following the flow switch is a pressure gauge, which is used to check the pressure of the line prior to the liquid passing through the positive displacement pump. As noted, the system as shown includes a diaphragm pump and hydraulic motor for operating the pump. Diaphragm pumps provide numerous advantages, including, but not limited to, the ability to handle a wide variety of fluids with high solids content, being self-priming, the ability to run dry, being generally explosion proof, having generally constant pumping efficiency, providing variable flow rate and discharge pressure, not overheating, not requiring mechanical seals, couplings, or motors, being submersible, being portable, being dead head, requiring simple installation, having high pressure capabilities, not requiring pressure relief or bypass, having shear sensitivity, and being easily maintained and also relatively inexpensive.

Another filtering device, in the form of a pressure strainer, follows the positive displacement pump, and is designed to protect the hydraulic lines, pressure regulator, and flowmeter from foreign objects. The liquid fertilizer then passes through two pressure gauges. The pressure gauges are placed with the pressure regulator in between so as to be able to monitor pressure and correct functioning of the system in the area of liquid flowing in a direction back towards the supply through the pressure regulator. In addition, the pressure gauges could be pressure sensors to provide direct feedback to the system. The pressure regulator is preferably a motorized relief valve modulated with a spring. This motorized relief valve offers quick adjustment to commands by the user or changes in pressure so as to regulate the system after the manner desired for the agricultural field's needs.

As noted herein, the motorized relief valve provides numerous advantages over the use of traditional ball valves and other, similar valves. For example, including such a valve, which may be a pressure regulator that is modulated with a spring provides for incremental changes and increased speed to make any change to the system. With traditional ball valves, any change is slow, and it is difficult to make incremental changes in allowing a fluid to pass through. The pressure regulator as shown and describes allows for near infinite change to the system in a quick manner to provide instantaneous feedback to the system.

Still further, the pressure regulator keeps the pressure as set by a user in a near-instantaneous manner by relieving or creating additional pressure through an opening in an incremental manner. This provides even greater control for the system and keeps the system at the pressure set by the user.

After the liquid fertilizer has traveled through the positive displacement pump, through the filtration device, and past the two pressure gauges, the liquid fertilizer passes through a flowmeter. The flowmeter is included to monitor the flow of the system. According to at least some aspects of some embodiments, the flowmeter is not in place to control the flow, but to confirm the flow. As noted, the prior art utilizes flowmeters to control the flow of a liquid fertilizer system, most often by fitting the flowmeter with an integrated flow control valve which controls output flow.

According to aspects of the invention however, flow is not what is controlled, it is the system pressure that regulates the distribution of the liquid fertilizer. The flowmeter is not controlling, rather just providing feedback. If the flow of the liquid fertilizer is at a dangerous or undesirable flow, this can trigger a response for the system to shut off the liquid distribution to the row units by using the row unit shutoffs. If the flowmeter registers however that the flow is desirable and/or safe, the liquid fertilizer will continue to flow through the system passing through another pressure gauge, and then out through a dispensing apparatus in which the liquid fertilizer will be distributed out desirable positions from the row units.

Therefore, as understood from the present disclosure, the system provided includes providing and applying the liquid fertilizer at system level, and not on a row-by-row basis. The motorized relief valve, shown to be a pressure regulator modulated with a spring, responds quickly to changes, row control, and other updates that may be needed to the system. The modulation by spring is a significant improvement over the use of ball valves, which others have used to control the flow. As is known, ball valves are slow to react and are tougher to control the amount of product passing therethrough, especially when attempting to modulate in smaller increments. The use of the spring-modulated pressure regulator provides for a more nuanced control with precision and feedback.

Still further, the system regulates pressure, not flow. The flow feedback from the flow meter is used to aid in setting the system pressure and provides feedback to keep the system in a closed loop. However, it is the setting and maintenance of the system pressure for the fertilizer system as shown and described that provides numerous advantages and improvements.

From the foregoing, it can be seen that the invention accomplishes at least all of the stated objectives.

The invention claimed is:

1. A system of controlling liquid fertilizer distribution for an agricultural implement comprising:

a positive displacement pump pulling liquid fertilizer from a system source, wherein the positive displacement pump is in communication with a motor to transport the liquid fertilizer;

an electric ball valve and a filter between the system source and the positive displacement pump and a flow switch between the filter and the positive displacement pump to confirm the presence of the liquid fertilizer in the conduit;

an adjustable relief valve modulated with a spring, wherein the adjustable relief valve acts to regulate the pressure of the system;

a flowmeter to display flow of the liquid fertilizer; and dispensing apparatuses positioned downstream the flowmeter, with respect to a direction of transport for the liquid fertilizer, for spraying the liquid fertilizer onto a field;

wherein the dispensing apparatuses for distributing the liquid fertilizer onto a field are in parallel with one another.

2. The system of claim 1, wherein the adjustable relief valve comprises a motorized relief valve.

3. The system of claim 1, wherein the adjustable relief valve comprises a proportional relief valve.

4. The system of claim 1, wherein the positive displacement pump comprises:

a. a diaphragm pump;
b. a progressive cavity pump;
c. a peristaltic hose pump;
d. a piston pump; or
e. a gear pump.

5. The system of claim 4, wherein the positive displacement pump comprises a diaphragm pump and the motor comprises a hydraulic motor.

6. The system of claim 4, wherein the motor comprises an electric motor.

7. The system of claim 1, wherein the filter comprises a suction strainer with an integrated foot valve.

8. The system of claim 1, further comprising a pressure gauge between the flow switch and the positive displacement pump.

9. The system of claim 8, further comprising additional pressure gauges downstream of the positive displacement pump.

10. The system of claim 9, wherein at least one of the pressure gauges downstream of the positive displacement pump comprises a pressure sensor to provide direct feedback to the system.

11. The system of claim 8, further comprising a pressure regulator associated with the additional pressure gauges downstream of the positive displacement pump to monitor pressure and correct functioning of the system.

12. An agricultural implement, comprising:

a plurality of ground engaging row units; and a system of controlling liquid fertilizer distribution via the plurality of ground engaging row units, the system comprising:

a positive displacement pump pulling liquid fertilizer from a system source, wherein the positive displacement pump is in communication with a motor to transport the liquid fertilizer;

an electric ball valve and a filter between the system source and the positive displacement pump and a flow switch between the filter and the positive displacement pump to confirm the presence of the liquid fertilizer in the conduit;

an adjustable relief valve modulated with a spring, wherein the adjustable relief valve acts to regulate the pressure of the system;

a flowmeter to display flow of the liquid fertilizer; and apparatuses positioned on the row units for spraying the liquid fertilizer onto a field;

wherein all dispensing apparatuses for spraying the liquid fertilizer onto a field are in parallel with one another.

13. The agricultural implement of claim 12, wherein the positive displacement pump comprises:

a. a diaphragm pump;
b. a progressive cavity pump;
c. a peristaltic hose pump;
d. a piston pump; or
e. a gear pump.

14. The agricultural implement of claim 12, wherein the adjustable relief valve comprises a motorized relief valve.

* * * * *